United States Patent Office 3,816,478
Patented June 11, 1974

3,816,478
PURIFICATION OF A MATERIAL CONTAINING ALDEHYDE IMPURITIES
Thomas A. Washall, North Hills, Del., and Walter A. Mameniskis, Drexel Hill, Pa., assignors to Atlantic Richfield Company, Los Angeles, Calif.
No Drawing. Continuation of abandoned application Ser. No. 56,723, July 20, 1970. This application Aug. 23, 1972, Ser. No. 283,125
Int. Cl. C07d 1/00
U.S. Cl. 260—348 R
9 Claims

ABSTRACT OF THE DISCLOSURE

Aldehyde impurities are effectively removed from organic liquids containing small amounts of water by passing same through a solid sodium bisulfite bed. The bed can be regenerated by heating to 75° C. to 120° C. As an example, propylene oxide containing 2000 p.p.m. acetaldehyde can be purified to an acetaldehyde content of less than 10 p.p.m.

CROSS-NOTATION

This is a streamlined continuation application of parent application Ser. No. 56,723, filed July 20, 1970 and now abandoned.

BACKGROUND OF THE INVENTION

This invention relates to a process for removing undesired low molecular weight aldehydes from organic liquids. More particularly, this invention relates to the removal of formaldehyde, acetaldehyde or propionaldehyde from saturated or unsaturated, substituted or unsubstituted alcohols, ethers, esters or epoxides.

The problem of removal of small quantities low molecular weight aldehydes is well known. These aldehydes are created as by-products during certain processes for preparation of certain organic compounds. For example, one process for preparing propylene oxide from the organic peroxide oxidation of propylene produces by-product acetaldehyde which is undesirable in polymerization reactions and which causes discoloration of the propylene oxide. Removal of the by-product is difficult when distillation is not efficient or practicable.

The classical method for removing low molecular weight aldehydes is contacting with aqueous sodium bisulfite. This method has disadvantages in that it is often exothermic which can lead to decomposition of the organic liquid, especially in the case of organic epoxides, and further the aqueous sodium bisulfite can not be re-easily and used.

SUMMARY OF THE INVENTION

It is therefore an object to provide an efficient method for removal of low molecular weight aldehydes from organic liquids.

It is a further object to reduce the acetaldehyde, formaldehyde, and propionaldehyde content in ethers, alcohols, esters and epoxides.

It is a further object to remove aldehydes from organic liquids without substantial heat generation.

It is a further object to provide a process for removing aldehydes with a material which can be regenerated easily and reused.

These and other objects as will become apparent to those skilled in the art are accomplished by the process of the invention which comprises passing an organic feed which contains undesired quantities of low molecular weight aldehydes through a bed of solid sodium bisulfite. The feed must contain small quantities of water in this invention.

DESCRIPTION OF THE PREFERRED EMBODIMENTS

The organic feed may be any unsaturated or saturated, substituted or unsubstituted alcohol, ether, ester or epoxide. Examples of alcohols suitable are methyl, ethyl isopropyl, sec-butyl, isobutyl, t-butyl and n-butyl alcohols.

Examples of ethers suitable are diethyl ether, ethyl isopropyl ether, ethyl n-propyl ether, etc.

Examples of esters suitable are methyl acetate, ethyl acetate, methyl formate and ethyl formate.

Examples of epoxides suitable are ethylene oxide, propylene oxide, butylene oxide, isobutylene oxide, epichlorohydrin, and butadiene monoepoxides and diepoxides. When ethylene oxide is the organic feed, temperature and pressure conditions should be adjusted so that the feed is liquid.

The organic compound should be liquid at the operating temperatures and pressures.

Operating temperature is usually room temperature and pressure is atmospheric, or slightly above to insure constant flow rate, however, this is not a criticality except to the degree that at higher temperatures the sodium bisulfite releases the aldehyde it has trapped. Otherwise, elevated and lower temperatures and sub-atmospheric and superatmospheric pressures are suitable. Preferred temperatures are from about 5° C. to about 90° C., more preferably from about 15° C. to about 40° C., and most preferably from about 20° C. to about 30° C. From about 1 to about 10 atmospheres are preferred, while from about 1 to about 2 atmospheres is most preferred due to convenience.

The process is especially advantageous when the aldehyde to be removed and the organic liquid have close boiling points; in such cases, distillation is a difficult means of separation.

Water must be present in the organic liquid. From 0.1% to 10% water by volume can be employed, but 0.5% to 5% is preferred. The most suitable water content appears to be from 0.9% to 2% by volume. Our theory is that the water forms an aqueous film on the sodium bisulfite particles, facilitating the forming of the sodium bisulfite-aldehyde adduct.

The sodium bisulphite can be as small as 325 mesh (U.S. sieve series) and as large as 1/8" pellets, but from 35 to 100 mesh is preferred. The choice of particle size will depend upon the diameter of the column, the particular flow rate and pressure selected.

The sodium bisulfite is present in a column or tower, and remains in place while the organic liquid is passed therethrough. A stirred vessel can be used, but it is less preferable because of the fines which are often caused by the stirring of granular sodium bisulfite.

When the sodium bisulfite becomes saturated with aldehyde and no longer efficiently removes aldehyde from the organic liquid to the desired degree, it may be regenerated by a simple heat step. This step comprises washing the sodium bisulfite bed with a suitable inert solvent to displace the organic liquid and purging the bed with an inert gas at elevated temperatures. The inert solvent can be any hydrocarbon, for example, n-pentane, isooctane, isobutane, etc., preferably of different boiling point from the organic liquid feed. The inert gas is preferably nitrogen or air. The temperatures for regeneration can be from about 75° C. to about 150° C. A most suitable temperature is about 100° C., and a steam jacket is a very suitable and practical means for regenerating at this temperature.

The following examples are present for illustration of the process of the invention as it applies to a particular organic liquid feed, but as disclosed above it is operable with other organic liquid feeds containing low molecular weight aldehydes.

EXAMPLE I

A 15 inch glass column having a diameter of 1¼ inches was packed with 268 grams of 32 to 100 mesh solid sodium bisulfite. At a flow rate of from 1.5 to 4.0 mls./min., propylene oxide containing 200 p.p.m. acetaldehyde, 220 p.p.m. acetone, and 1% (vol.) water was passed counter gravity until 2270 mls. of propylene oxide were collected. A gas chromatographic analysis showed that the acetone content was not significantly reduced but that the acetaldehyde content was reduced to less than 10 p.p.m.

EXAMPLE II

A 31 x 1.8 cm. glass column was packed with 62 gms. of 32–100 mesh sodium bisulfite. Propylene oxide containing 200 p.p.m. of acetaldehyde and 200 p.p.m. acetone containing 0.5% water was percolated through the glass column. The acetaldehyde level in the effluent slowly dropped to 8 p.p.m. After 2.0 liters were collected, the acetaldehyde content in the feed was increased to 2000 p.p.m. resulting in an increase in the acetaldehyde level in the effluent to 540 p.p.m.

EXAMPLE III

Example II was repeated except that the propylene oxide contained 1.0% of water instead of 0.5%. The acetaldehyde immediately dropped to 10 p.p.m. When the acetaldehyde content in the feed was increased to 2000 p.p.m., the effluent acetaldehyde content only rose to 19 p.p.m.

EXAMPLE IV

Thermal Regeneration

An 11 mm. OD glass-jacketed column containing 50 gms. of 32–100 mesh sodium bisulfite was used to remove acetaldehyde from propylene oxide feed containing 2000 p.p.m. acetaldehyde until the effluent began to show high (25 p.p.m.) acetaldehyde values, indicating diminished activity. The feed was removed by passing isooctane through the column, the column was purged with nitrogen at a pressure of 5 p.s.i.g., and steam at atmospheric pressure was passed through the glass outer jacket for 30 minutes to heat the sodium bisulfite bed. The nitrogen was turned off for 15 minutes to allow the center of the column to reach thermal equilibrium and turned on again for 15 minutes.

The propylene oxide feed containing 2000 p.p.m. acetaldehyde was started again. The effluent contained less than 25 p.p.m. acetaldehyde proving that the bed was effectively regenerated.

EXAMPLE V

Following the procedure of the preceding examples, isopropyl alcohol containing 2000 p.p.m. formaldehyde and 1% water is passed over a solid potassium bisulfite bed, resulting in significant reduction in aldehyde content.

EXAMPLE VI

Following the procedure of the preceding examples, diethyl ether containing 2000 p.p.m. acetaldehyde and 1% water is passed over a solid potassium bisulfite bed, resulting in significant reduction in aldehyde content.

EXAMPLE VII

Following the procedure of the preceding examples, methyl acetate containing 2000 p.p.m. formaldehyde and 1% water is passed over a solid potassium bisulfite bed, resulting in significant reduction in aldehyde content.

EXAMPLE VIII

Following procedure of Example I except utilizing a propylene oxide containing no water, the acetaldehyde level is not significantly reduced.

Although the present invention has been described herein in terms of specific embodiments and examples thereof, it is not intended that the scope thereof be limited in any way thereby except as indicated in the following claims.

We claim:

1. A process for removing low molecular weight aldehydes from a liquid organic feed containing from 0.1 to 10 percent by volume water, said feed being selected from the group consisting of methanol, ethanol, sec-butyl alcohol, isobutyl alcohol, t-butyl alcohol, n-butyl alcohol, ethyl isopropyl ether, ethyl n-propyl ether, ethyl acetate, methyl formate, ethylene oxide, propylene oxide, butylene oxide, isobutylene oxide, epichlorohydrin, butadiene diepoxide and butadiene monoepoxide comprising passing said liquid feed through a bed consisting essentially of solid particles of sodium bisulfite having an average particle size within a range from about 300 mesh to about ⅛ inch, whereby the low molecular weight aldehyde is retained in the bed and the effluent from the bed is substantially free from low molecular weight aldehyde.

2. The process of claim 1 wherein the solid sodium bisulfite particles have an average size from about 35 mesh to about 100 mesh.

3. The process of claim 1 wherein acetaldehyde is removed from a feed consisting essentially of propylene oxide.

4. The process of claim 1 wherein the feed contains from about 0.5 to about 5% by volume water.

5. The process of claim 1 wherein the feed contains from about 0.9% to about 2% water by volume.

6. The process of claim 1 wherein the solid sodium bisulfite bed is periodically reactivated by treating the bed with an organic solvent and then heating to a temperature from about 75° C. to about 120° C. to drive off the entrapped aldehyde.

7. The process of claim 6 wherein said reactivation is carried out in the presence of an inert gas, whereby the low molecular weight aldehyde is withdrawn in the effluent stream of inert gas.

8. A process for removing low molecular weight aldehydes from a propylene oxide feed containing from about 0.1% to 10% by volume of water which consists essentially of passing said feed through a bed of solid sodium bisulfite particles whereby the aldehydes are retained in said bed, and withdrawing a purified stream of propylene oxide substantially free from low molecular weight aldehydes.

9. The process of claim 8 wherein said percentage of water is from about 0.5 to about 1, and a hot inert gas is employed for reactivating the sodium bisulfite particles.

References Cited

UNITED STATES PATENTS 3,213,113  10/1965  Randall et al.  260—348 R

FOREIGN PATENTS 1,379,767  10/1964  France.

NORMA S. MILESTONE, Primary Examiner

U.S. Cl. X.R.

260—499, 616, 643